(12) United States Patent
Xiang et al.

(10) Patent No.: US 10,795,322 B2
(45) Date of Patent: Oct. 6, 2020

(54) LEARNING METHOD FOR SMARTWATCH TO PREVENT METAL HAND FROM LIGHTENING THE SCREEN BY UNINTENDED TOUCH

(71) Applicant: Guangdong Appscomm Co., Ltd, Guangzhou, Guangdong (CN)

(72) Inventors: Fei Xiang, Guangdong (CN); Bin Li, Guangdong (CN); Caican Lin, Guangdong (CN); Rui Xiao, Guangdong (CN); Wei Gu, Guangdong (CN); Xiaogao Zhou, Guangdong (CN); Guang Yang, Guangdong (CN); Lijun Qiao, Guangdong (CN)

(73) Assignee: Guangdong Appscomm Co., Ltd, Guangzhou (CN)

(*) Notice: Subject to any disclaimer, the term of this patent is extended or adjusted under 35 U.S.C. 154(b) by 0 days.

(21) Appl. No.: 16/541,135

(22) Filed: Aug. 14, 2019

(65) Prior Publication Data

US 2019/0369568 A1 Dec. 5, 2019

Related U.S. Application Data

(63) Continuation of application No. PCT/CN2017/095385, filed on Aug. 1, 2017.

(30) Foreign Application Priority Data

Feb. 21, 2017 (CN) .......................... 2017 1 0093132

(51) Int. Cl.
*G04G 21/08* (2010.01)
*G06F 3/0481* (2013.01)

(52) U.S. Cl.
CPC ......... *G04G 21/08* (2013.01); *G06F 3/04812* (2013.01)

(58) Field of Classification Search
CPC ..... G06F 3/04812; G04G 21/04; G04G 21/08
See application file for complete search history.

(56) References Cited

U.S. PATENT DOCUMENTS

| 9,939,788 B2* | 4/2018 | Ko ........................... G04C 17/00 |
| 10,599,327 B2* | 3/2020 | Kim ....................... G04G 21/08 |
| 2016/0091867 A1* | 3/2016 | Mansour ................ G04G 21/08 |
| | | 368/294 |
| 2016/0240149 A1* | 8/2016 | Kim ....................... G06F 1/3218 |
| 2016/0283094 A1* | 9/2016 | Choi ........................ G06F 1/163 |
| 2016/0327911 A1* | 11/2016 | Eim ....................... G06F 3/0362 |

(Continued)

FOREIGN PATENT DOCUMENTS

CN          106773618          5/2017

OTHER PUBLICATIONS

International Search Report of PCT Patent Application No. PCT/CN2017/095385 dated Nov. 20, 2017.

*Primary Examiner* — Vinh T Lam

(57) ABSTRACT

With regard to a learning method for a smartwatch to prevent a metal hand from lightening the screen by unintended touch, a mainboard chip firstly finds and learns points which unintendedly touch the screen. Then, the mainboard chip reserves the time Tm which leads to unintended touch on the screen. The mainboard chip judges the present state: at the reserved time Tm, if the display screen is in an ON state, the display screen will keep the ON state. If the display screen is in an OFF state, the display screen will keep the OFF state.

2 Claims, 1 Drawing Sheet

(56) References Cited

U.S. PATENT DOCUMENTS

| | | | |
|---|---|---|---|
| 2018/0011450 A1* | 1/2018 | Stackowski | G04G 21/08 |
| 2018/0181733 A1* | 6/2018 | Shim | G06F 21/32 |
| 2018/0188925 A1* | 7/2018 | Na | G04C 3/001 |
| 2018/0196396 A1* | 7/2018 | Cho | G04G 21/08 |
| 2018/0196397 A1* | 7/2018 | Clivaz | G04G 21/04 |
| 2018/0260064 A1* | 9/2018 | Chae | G04G 21/08 |
| 2018/0294844 A1* | 10/2018 | Choi | G06F 3/0488 |

* cited by examiner

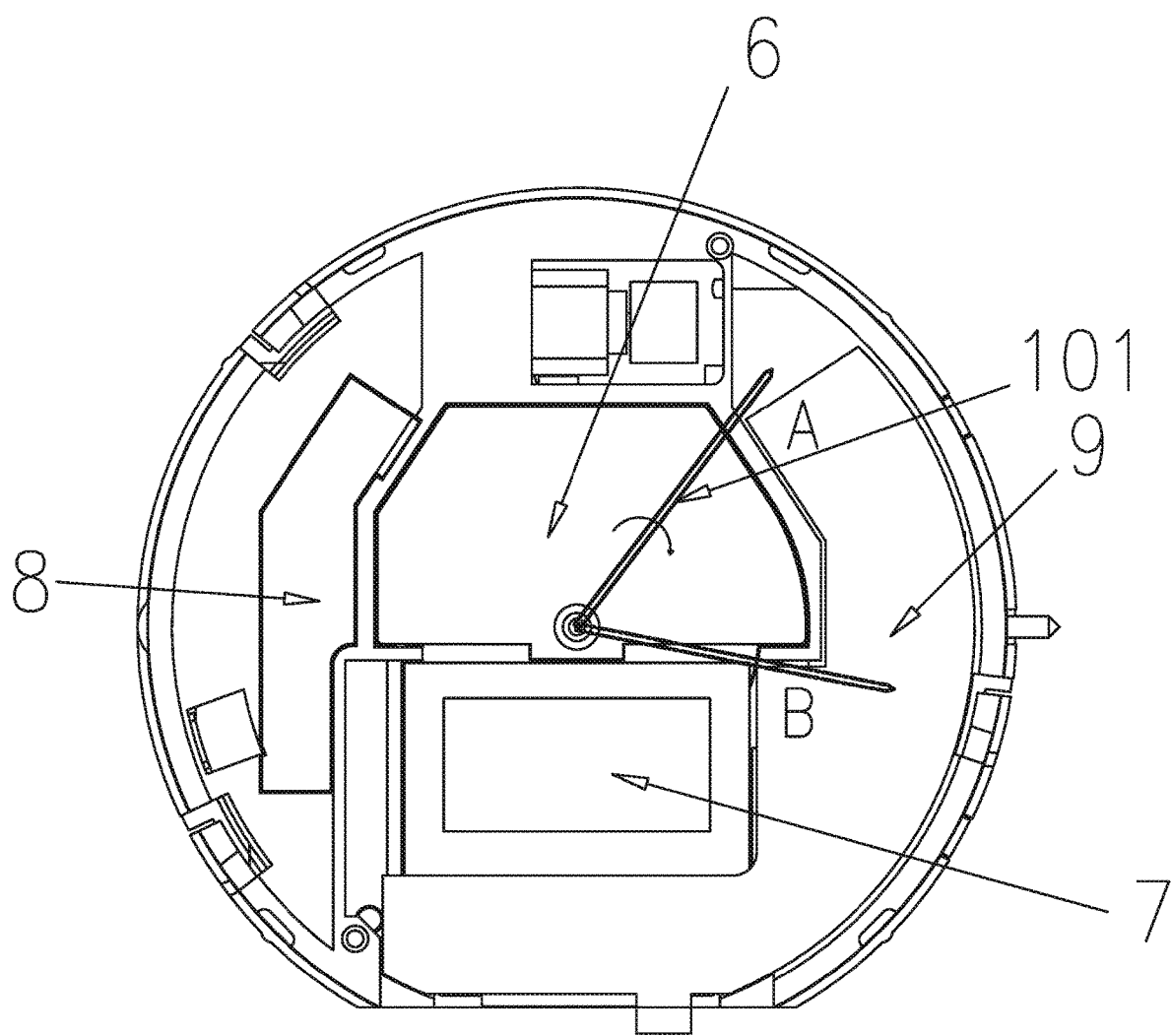

LEARNING METHOD FOR SMARTWATCH TO PREVENT METAL HAND FROM LIGHTENING THE SCREEN BY UNINTENDED TOUCH

CROSS REFERENCE TO RELATED APPLICATIONS

The present application is a Continuation Application of PCT Application No. PCT/CN2017/095385 filed on Aug. 1, 2017, which claims the benefit of Chinese Patent Application No. 201710093132.7 filed on Feb. 21, 2017, the contents of which are incorporated herein by reference in their entirety.

FIELD OF THE INVENTION

The present invention relates to a control method of a smartwatch, and in particular to a method to lighten the screen of a smartwatch in an unintended manner by a metal hand.

BACKGROUND OF THE INVENTION

The present smartwatches are generally controlled by keys, and there are also some smartwatches with a touch function. However, the surfaces of most smartwatches are made of glass, and the range of touch is very narrow. As a result, it is inconvenient for users to operate, thus bringing poor user experience. Due to direct purchase of some ICs with Floating Touch, and the limitations of the range of touch and watch hand, hands of the smartwatch can only include an hour hand and a minute hand. After a second hand is added, the touch feeling is not good enough and there is the phenomenon of touch failure. To solve the phenomenon of poor touch feeling and touch failure, the applicant rationally installed a touch FPC in the previous application through creative work. Even if a thick glass shell or other thick shell is used, touch control will not fail. Especially for two-hand or three-hand watches mostly applied at present, the installation of multiple hands on the hand shaft will inevitably increase thickness of smartwatches. The large-area touch FPC can well solve the technical problem of Floating Touch.

However, it is found through detection that, although the distance of Floating Touch increases greatly, some negative effects are also brought. As shown in the sole FIGURE, 101 represents the metal hand of the smartwatch, and 9 represents a touch FPC after the area increases. The touch FPC considers the structure of installation parts, and the outer contour line of the part close to a movement cover plate 6 has stair turning with the outer contour line of the movement cover plate 6. Besides, the starting location at the clockwise direction of the touch FPC is of a right-angled shape. When the metal hand 101 rotates to the right angle location (A in the FIGURE) of the starting point of the touch FPC, and the stair turning location (B in the FIGURE) in the sole FIGURE, and the touch FPC induces the metal hand which can lead to the screen illumination, the screen will be lightened.

The applicant described a manual record means in the above application CN2017100058434, but manual record may cause inaccurate time.

SUMMARY OF THE INVENTION

For the above technical problem, the following technical solution is proposed according to the structure of touch FPC:

According to the learning method for a smartwatch to prevent a metal hand from lightening a screen by an unintended touch, the smartwatch comprises a mainboard chip, a touch FPC (9), a display screen (7), and at least one metal hand (101), when the touch FPC (9) is triggered, the display screen (7) is lightened; a memory module is in the mainboard chip, and the memory module contains time sets T1, T2, ..., Tn, where n is an integer greater than 2;

the learning method comprises the following steps:

Step I, in a first rotation period of each metal hand, the mainboard chip records a first time data generated by the metal hand (101) on a dial plate when the display screen is lightened, and puts the first time data into the time set T1;

Step II, in a next rotation period after the first one, namely, a second rotation period, the mainboard chip records a second time data generated by the metal hand (101) on the dial plate when the display screen is lightened, and puts the second time data into the time set T2;

Step III, Step II is repeated until in an $n^{th}$ rotation period, the mainboard chip records an $n^{th}$ time data generated by the metal hand (101) on the dial plate when the display screen is lightened, and puts the $n^{th}$ time data into the time set Tn;

Step IV, all the time data in the time sets T1, T2, ..., Tn are processed, if an appearance frequency of a time data Tm on the dial plate in all time sets T1, T2, ..., Tn is greater than or equal to a % n, wherein a $\in$ (10-100], the mainboard chip learns that the time data Tm on the dial plate is a time when the display screen is triggered to be lightened; if the appearance frequency of the time data Tm in all time sets T1, T2, ..., Tn is less than a % n, the mainboard chip learns that the time data Tm on the dial plate is not the time when the display screen is triggered to be lightened.

The method to prevent a metal hand from lightening a screen by an unintended touch based on the learning method according to claim 1, comprising the following steps:

Step V, reserve the time data Tm on the dial plate learned by the mainboard chip which is the time when the display screen is triggered to be lightened, and delete the time data Tm on the dial plate learned by the mainboard chip which is not the time when the display screen is triggered to be lightened;

Step VI, the mainboard chip calculates a time tm when the screen is triggered to be lightened at a same location by at least one metal hand at a $p^{th}$ time according to the time reserved in Step V and a property of the metal hand, the metal hand includes a second hand and a minute hand, the tm of the second hand is equal to Tm+60p, and the tm of the minute hand is equal to Tm+3600p, p is a natural number;

Step VII, the mainboard chip judges the current stage: at the reserved time data Tm and the time tm, if the display screen is in an ON state, the display screen will keep the ON state; if the display screen is in an OFF state, the display screen will keep the OFF state.

Through the above method, when the metal hand rotates to the right angle location of the starting point of the touch FPC, and the midway stair turning location in the FIGURE, or other locations causing the touch FPC to be triggered, the touch FPC induces the metal hand which may cause the screen to be lightened, thus generating the phenomenon of unintended screen illumination.

BRIEF DESCRIPTION OF THE DRAWINGS

The sole FIGURE shows the structure diagram of the present smartwatch.

101—metal hand; 6—movement cover plate; 7—display screen; 8—bluetooth antenna; 9—touch FPC.

DETAILED DESCRIPTION OF THE PREFERRED EMBODIMENTS

Exemplary embodiments will now be described more fully with reference to the accompanying drawing. However, the exemplary embodiments can be implemented in multiple forms, and should not be construed as being only limited to that exemplary embodiments set forth herein. On the contrary, these exemplary embodiments are provided so that the present invention will be more comprehensive and complete, and the conception of exemplary embodiments will be fully conveyed to those skilled in the art. The FIGURE is schematic only, and is not drawn to scale. The same drawing marks in the FIGURE present the same or similar parts, so repetitive description thereof will be omitted.

Furthermore, the described features, structures, or features may be combined in one or more embodiments in any suitable manner. In the following description, a plurality of specific details are provided to give a thorough understanding of embodiments of the present invention. However, one skilled in the art will recognize that the invention may be practiced without one or more of the specific details, or with other methods, components, devices, steps and so forth. In other circumstances, the known structure, method, device, implementation or operation will not be shown or described in detail to prevent obscuring various aspects of the present invention.

As shown in the sole FIGURE, the smartwatch consists of a mainboard chip, a touch FPC 9, a display screen 7 and at least one metal hand 101. When the touch FPC 9 is triggered, the mainboard chip controls the display screen to be lightened.

In practical operation, users can trigger the touch FPC9 through floating touch of the glass screen of the smartwatch, thus lightening the screen. But when the metal hand is rotating, because the FPC has a turning point location, the touch FPC can be easily triggered, as shown at A and B in the sole FIGURE. Although the turning point location may exist, these turning points are not necessarily the turning points which will trigger the touch FPC when the metal hand is rotating. Therefore, it is necessary to automatically find out the points which cause the screen to be lightened by unintended touch through experimental verification and mainboard chip learning.

Firstly, the mainboard chip learns the points which may cause the screen to be lightened by unintended touch, that is, find out the points cause the screen to be lightened by unintended touch. A is in the mainboard chip, and the memory module contains time sets T1, T2, . . . , Tn, where n is an integer greater than 2.

For example, the metal hand is a second hand. In the first rotation period, namely 60 s, the moments of the second hand on the dial plate causing the screen to be lightened are 13 s, 20 s, 25 s, and 33 s. The four moments are saved in the time set T1.

In the second rotation period, the moments of the second hand on the dial plate causing the screen to be lightened are 13 s and 33 s. The two moments are saved in the time set T2.

In the third rotation period, the moments of the second hand on the dial plate causing the screen to be lightened are 13 s, 20 s, and 33 s. The three moments are saved in the time set T3.

In the fourth rotation period, the moments of the second hand on the dial plate causing the screen to be lightened are 13 s and 20 s. The two moments are saved in the time set T4.

In the fifth rotation period, the moments of the second hand on the dial plate causing the screen to be lightened are 13 s and 20 s. The two moments are saved in the time set T5.

All time data in the time sets T1, T2, . . . , Tn are processed. If the appearance frequency of the time Tm on a dial plate in all time sets T1, T2, . . . , Tn is greater than or equal to a % n, wherein a E (10-100], the time Tm on the dial plate learned by the mainboard chip is the time when the display screen is triggered to be lightened. If the appearance frequency of the time Tm in the time sets T1, T2, . . . , Tn is less than a % n, the time Tm on the dial plate learned by the mainboard chip is not the time when the display screen is triggered to be lightened.

When a=60 and n=5, the judgment threshold is 3. The appearance frequency of 13 s is 5. The appearance frequency of 20 s is 4. The appearance frequency of 25 s is 1. The appearance frequency of 33 s is 3. Hence, 13 s, 20 s, and 33 s are the moments learned by the mainboard chip when the display screen is triggered to be lightened, while 25 s is not the time when the display screen is triggered to be lightened.

The mainboard chip judges the present state: at the reserved time Tm (13 s, 20 s, and 33 s) and the time tm (tm=Tm+60p, p is a natural number), Tm and tm are the time when all second hands pass 13 s, 20 s, and 33 s on the dial plate. If the display screen is in an on state, the display screen will keep the ON state. If the display screen is in an OFF state, the display screen will keep the OFF state.

The metal hand includes a second hand and a minute hand, tm of the second hand is equal to Tm+60p (s), and tm of the minute hand is equal to Tm+3600p.

Through the above method, when the metal hand rotates to the right angle location of the starting point of the touch FPC, and the midway stair turning location in the sole FIGURE, or other locations causing the touch FPC to be triggered, the touch FPC induces the metal hand which may cause the screen to be lightened, thus generating the phenomenon of unintended screen illumination.

Finally, it should be noted that the above embodiments are only used to explain the technical solution of the present invention and shall not be construed as the limitation thereof. Although the present invention is described in detail with reference to the embodiments, those of ordinary skill in the art should understand that, they can still modify the technical solution recorded in the embodiments or equivalently substitute some or all of technical features. These modifications or substitutions do not make the essence of the corresponding technical proposal break away from the scope of the technical solution of the embodiments in the present invention.

The invention claimed is:

1. A learning method for a smartwatch to prevent a metal hand from lightening a screen by an unintended touch, wherein the smartwatch comprises a mainboard chip, a touch FPC (9), a display screen (7), and at least one metal hand (101), when the touch FPC (9) is triggered, the display screen (7) is lightened; a memory module is in the mainboard chip, and the memory module contains time sets T1, T2, . . . , Tn, where n is an integer greater than 2;

the learning method comprises the following steps:

Step I, in a first rotation period of each metal hand, the mainboard chip records a first time data generated by the metal hand (101) on a dial plate when the display screen is lightened, and puts the first time data into the time set T1;

Step II, in a next rotation period after the first one, namely, a second rotation period, the mainboard chip records a second time data generated by the metal hand (101) on the dial plate when the display screen is lightened, and puts the second time data into the time set T2;

Step III, Step II is repeated until in an $n^{th}$ rotation period, the mainboard chip records an $n^{th}$ time data generated by the metal hand (101) on the dial plate when the display screen is lightened, and puts the $n^{th}$ time data into the time set Tn;

Step IV, all the time data in the time sets T1, T2, . . . , Tn are processed, if an appearance frequency of a time data Tm on the dial plate in all time sets T1, T2, . . . , Tn is greater than or equal to a % n, wherein a $\in$ (10-100], the mainboard chip learns that the time data Tm on the dial plate is a time when the display screen is triggered to be lightened; if the appearance frequency of the time data Tm in all time sets T1, T2, . . . , Tn is less than a % n, the mainboard chip learns that the time data Tm on the dial plate is not the time when the display screen is triggered to be lightened.

2. The method to prevent a metal hand from lightening a screen by an unintended touch based on the learning method according to claim 1, comprising the following steps:

Step V, reserve the time data Tm on the dial plate learned by the mainboard chip which is the time when the display screen is triggered to be lightened, and delete the time data Tm on the dial plate learned by the mainboard chip which is not the time when the display screen is triggered to be lightened;

Step VI, the mainboard chip calculates a time tm when the screen is triggered to be lightened at a same location by at least one metal hand at a $p^{th}$ time according to the time reserved in Step V and a property of the metal hand, the metal hand includes a second hand and a minute hand, the tm of the second hand is equal to Tm+60p, and the tm of the minute hand is equal to Tm+3600p, p is a natural number;

Step VII, the mainboard chip judges the current stage: at the reserved time data Tm and the time tm, if the display screen is in an ON state, the display screen will keep the ON state; if the display screen is in an OFF state, the display screen will keep the OFF state.

* * * * *